United States Patent
Moore et al.

(10) Patent No.: US 9,417,470 B2
(45) Date of Patent: Aug. 16, 2016

(54) DRIVER CIRCUIT

(75) Inventors: John Richard Moore, Cambridge (GB); William Alden Crossland, Cambridge (GB); Daping Chu, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 84 days.

(21) Appl. No.: 14/344,685

(22) PCT Filed: Sep. 6, 2012

(86) PCT No.: PCT/GB2012/052188
§ 371 (c)(1),
(2), (4) Date: Mar. 13, 2014

(87) PCT Pub. No.: WO2013/038152
PCT Pub. Date: Mar. 21, 2013

(65) Prior Publication Data
US 2014/0347583 A1   Nov. 27, 2014

(51) Int. Cl.
*G09G 3/36* (2006.01)
*G02F 1/133* (2006.01)
*G02F 1/137* (2006.01)

(52) U.S. Cl.
CPC .............. *G02F 1/13306* (2013.01); *G09G 3/36* (2013.01); *G02F 1/13781* (2013.01); *G09G 2330/024* (2013.01)

(58) Field of Classification Search
CPC ... G02F 1/13306; G02F 1/13781; G09G 3/36; G09G 2330/024; C09K 19/025; C09K 19/406; C09K 19/542
See application file for complete search history.

(56) References Cited

U.S. PATENT DOCUMENTS

| | | | |
|---|---|---|---|
| 5,216,415 A | 6/1993 | Ono et al. | |
| 6,124,839 A | 9/2000 | Usui | |
| 8,357,312 B2 | 1/2013 | Sun | |
| 8,956,548 B2 * | 2/2015 | Clapp | C09K 19/406 252/299.01 |
| 8,999,195 B2 * | 4/2015 | Chu | C09K 19/02 252/299.01 |
| 2005/0226310 A1 * | 10/2005 | Nakazawa | G01K 13/002 374/208 |
| 2011/0080553 A1 | 4/2011 | Sun | |

FOREIGN PATENT DOCUMENTS

| | | |
|---|---|---|
| CN | 101295482 A | 10/2008 |
| CN | 201134234 Y | 10/2008 |
| CN | 101533162 A | 9/2009 |
| CN | 201514751 U | 6/2010 |
| CN | 101789226 A | 7/2010 |
| CN | 101789227 A | 7/2010 |
| CN | 101840085 A | 9/2010 |
| CN | 101840086 A | 9/2010 |
| CN | 101840090 A | 9/2010 |

(Continued)

OTHER PUBLICATIONS

International Search Report for Application No. PCT/GB2012/052188 dated Nov. 29, 2012, 4 pages.
(Continued)

*Primary Examiner* — Shean C Wu
(74) *Attorney, Agent, or Firm* — Howard & Howard Attorneys PLLC

(57) ABSTRACT

In a driver for a smectic-A composition liquid crystal panel, the driver forms a resonant circuit operable to oscillate at resonant frequency for ordering the smectic-A liquid crystal composition of the panel.

14 Claims, 2 Drawing Sheets

(56) References Cited

FOREIGN PATENT DOCUMENTS

| CN | 101840677 A | 9/2010 |
|---|---|---|
| CN | 101840681 A | 9/2010 |
| CN | 101840682 A | 9/2010 |
| CN | 101846855 A | 9/2010 |
| CN | 101866633 A | 10/2010 |
| CN | 201965373 U | 9/2011 |
| CN | 102402033 A | 4/2012 |
| CN | 102479490 A | 5/2012 |
| CN | 102622971 A | 8/2012 |
| CN | 102622972 A | 8/2012 |
| CN | 102681228 A | 9/2012 |
| CN | 102682722 A | 9/2012 |
| CN | 102830514 A | 12/2012 |
| CN | 102831865 A | 12/2012 |
| EP | 2 256 545 A1 | 12/2010 |
| GB | 2 274 649 A | 8/1994 |
| WO | WO 98/39794 A2 | 9/1998 |
| WO | WO 2004/022670 A1 | 3/2004 |
| WO | WO 2009/111919 A1 | 9/2009 |
| WO | WO 2011/115611 A1 | 9/2011 |
| WO | WO 2013/038148 A1 | 3/2013 |

OTHER PUBLICATIONS

English language abstract and machine-assisted English translation for CN 201134234 provided by Murgitroyd & Company on Apr. 25, 2014, 16 pages.

English language abstract for CN 101295482 extracted from espacenet.com database on Jun. 30, 2014, 1 page.

English language abstract for CN 201514751 extracted from espacenet.com database on Jun. 30, 2014, 1 page.

English language abstract for CN 101789226 extracted from espacenet.com database on Jun. 30, 2014, 1 page.

English language abstract for CN 101789227 extracted from espacenet.com database on Jun. 30, 2014, 1 page.

English language abstract for WO 2009/111919 extracted from espacenet.com database on Jun. 25, 2014, 1 page.

English language abstract and machine-assisted English translation for CN 101840085 provided by Murgitroyd & Company on Apr. 25, 2014, 26 pages.

English language abstract for CN 101840086 extracted from espacenet.com database on Jun. 30, 2014, 1 page.

English language abstract and machine-assisted English translation for CN 101840090 provided by Murgitroyd & Company on Apr. 25, 2014, 20 pages.

English language abstract for CN 101840677 extracted from espacenet.com database on Jun. 30, 2014, 1 page.

English language abstract and machine-assisted English translation for CN 101840681 provided by Murgitroyd & Company on Apr. 25, 2014, 29 pages.

English language abstract for CN 101840682 extracted from espacenet.com database on Jun. 30, 2014, 1 page.

English language abstract for CN 101846855 extracted from espacenet.com database on Jun. 30, 2014, 1 page.

English language abstract and machine-assisted English translation for CN 101866633 provided by Murgitroyd & Company on Apr. 25, 2014, 23 pages.

English language abstract for CN 201965373 extracted from espacenet.com database on Jun. 30, 2014, 1 page.

English language abstract for CN 102402033 extracted from espacenet.com database on Jun. 30, 2014, 1 page.

English language abstract for CN 102479490 extracted from espacenet.com database on Jun. 30, 2014, 1 page.

English language abstract and machine-assisted English translation for CN 102622972 provided by Murgitroyd & Company on Apr. 25, 2014, 18 pages.

English language abstract for CN 102681228 extracted from espacenet.com database on Jun. 30, 2014, 1 page.

English language abstract and machine-assisted English translation for CN 102682722 provided by Murgitroyd & Company on Apr. 25, 2014, 17 pages.

English language abstract for CN 102830514 extracted from espacenet.com database on Jun. 30, 2014, 1 page.

English language abstract and machine-assisted English translation for CN 102831865 provided by Murgitroyd & Company on Apr. 25, 2014, 14 pages.

English language abstract and machine-assisted English translation for CN 102622971 provided by Murgitroyd & Company on Apr. 25, 2014, 15 pages.

English language abstract for CN 101533162 extracted from espacenet.com database on Jun. 25, 2014, 1 page.

Aristov et al. "Features of the Control of Array-Type Liquid-Crystal Memory Displays", Journal of Optical Technology, vol. 68, No. 9, Sep. 30, 2001, pp. 660-664.

Crossland et al. "An Electrically Addressed Smectic Storage Device", SID Digest of Technical Papers, Apr. 30, 1985, pp. 124-127.

Fagerberg et al., "Electrically Addressed Smectic A Liquid Crystal Displays and Their Liquid Crystal Microstructure", SID International Symposium, Anaheim, CA., May 17-22, 1998, The Whole Document (4 pages).

Mitrokhin et al., "62.3: Reflective Bistable Smectic-A Passive Matrix LCDs", SID International Symposium, Boston, MA., May 24-27, 2005, vol. XXXVI, pp. 1774-1777.

International Search Report for Application No. PCT/GB2012/052184 dated Mar. 5, 2013, 4 pages.

* cited by examiner

DRIVER CIRCUIT

RELATED APPLICATIONS

This application is the National Stage of International Patent Application No. PCT/GB2012/052188, filed on Sep. 6, 2012, which claims priority to and all the advantages of Great Britain Application No. GB 1115868.0, filed on Sep. 14, 2011, the content of which is incorporated herein by reference.

The present invention is in the field of photonics. An embodiment relates to a driver circuit for a panel containing liquid crystal material.

An embodiment relates to panels in which a disordered state is produced by the process of SmA dynamic scattering and a clear, uniform state is induced by dielectric re-orientation.

Such panels may be used for example in applications where control of optical transmission is required—for example to reduce the amount of sunlight transmitted.

Liquid crystals have molecules which tend to self order without freezing and thus gain crystalline attributes even though they still flow and may fill a container. The phases of liquid crystals are broadly a generalised sequence of states that such a molecular fluid may pass through on the way from being an isotropic liquid until it freezes as a solid. In general such molecules will be typified by strong anisotropy. The form thin this anisotropy takes can be considered where the molecule is typified by a high aspect ratio (much longer than wide, thus "rod" or "lath" like), and may have dipole character, and anisotropic polarisability. In these cases the average direction of molecular orientation is referred to as the "director".

Nematic liquid, crystals typify the commonest liquid crystalline materials and are commonly used in liquid crystal flat screen devices and flat-panel displays. Extending the length or nematic mesogens, or other structural changes, very often causes them to show further phases upon cooling below the nematic phase, and before solidification, and at lower temperatures the typical character may be of a "layered fluid". Such layered liquid crystals are called "smectic" liquid crystals. Herein we will only consider the materials normally referred to as "smectic A", abbreviated to "SmA", liquid crystals. For example the proto-typical "5CB" (4'-pentyl-4-biphenylcarbonitrile), "5OCB" (is the ether linked pentyl, 4'-(pentyloxy)-4-biphenylcarbonitrile), is nematic, the "8CB" (4'-octyl-4-biphenylcarbonitrile) and "8OCB" (4'-(octyl oxy)-4-biphenylcarbonitrile), each exhibit a SmA phase beneath the higher temperature nematic phase, where in the abbreviation "mCB" and "mOCB";—in stands for an integer and refers to the number of carbon atoms in the alkyl or alkoxyl chain in 4-cyano-4'-n-alkylbiphenyl and 4-cyano-4'-n-alkoxybiphenyl, respectively; for example:

8CB=4-cyano-4'-octylbiphenyl; and
8OCB=4-cyano-41'-octyloxybiphenyl

The molecules forming SmA phases have similar properties to those forming nematic phases. They are rod-like and usually have a positive dielectric anisotropy. The introduction of a strong transverse dipole in order to induce a negative dielectric anisotropy tends to destabilise the SmA phase and may lead to increased chemical instability.

Smectic liquid crystals exhibit hysteresis in their switching so that dielectric re-orientation (or other disturbances of the smectic structure) does not relax when an applied electric field is removed. Unlike most nematic liquid crystal structures, dielectrically re-oriented SmA liquid crystals rest in the driven state until further forces are applied.

A panel may be formed by taking planar sheets, for example of glass, and applying to these a transparent conducting layer, typically made of indium tin oxide, the conducting layers being connected to conductors so that a variable field may be applied. These two sheets may be formed into a panel for example separated by heads of uniform diameter (typically, say, 5-15 micrometers, dependent on desired cell thickness). This panel is then edge sealed with glue allowing one or more apertures for tilling with the liquid crystal material.

Using such a cell a SmA liquid crystal layer may be formed by filling the panel (typically at an elevated temperature above the isotropic transition for the material). In the SmA devices discussed here, no alignment layers are required unlike nematic devices where uniform alignment of the cell is essential. On filling and thermally cycling such a SmA panel from room temperature to above the isotropic transition and back again, the liquid crystal will exhibit textures that are typical for the phases. Whilst the nematic, with no surface alignment, may appear in the well-known Schlieren texture where line defects or 'threads' scatter light, in the SmA a 'focal conic' texture is formed as a consequence of the layered structure of the SmA material. There is a sharp spatial variation in the refractive index which results in light scattering. The appearance of these textures results from the anisotropy of the refractive index, which is highest when light is travelling orthogonal to the more polarisable axis of the average molecular direction. The variation in refractive index causes light, scattering. When viewed (under a microscope) between crossed polarisers, contrast can also be observed between regions of different molecular orientations.

To electrically address a SmA liquid crystal panel an alternating (AC) field is normally applied. In non-doped materials, positive dielectric anisotropy of the LC will cause the re-arrangement of initially randomly aligned poly-domains, to align the mesogen with the field direction (normal to the glass surface). The panel will appear clear, as the average orientation of the anisotropic molecules is normal to the glass layer. For most non-doped SmA materials this situation is only reversible by heating the cell to destroy the SmA alignment.

If a suitable ionic dopant is dissolved in the SmA liquid crystal host, then under the influence of DC or low frequency (e.g. <200 Hz) electric fields, two orthogonal forces attempt to orient the smectic A director:

i) Dielectric re-orientation as described above attempts to align the SmA director (indicating the average direction of the long molecular axis) in the field direction.

ii) Simultaneously, the movement of ions through the SmA electrolyte attempts to align the smectic A director in the direction in which ions find it easier to travel.

In SmA materials this is within the layers i.e. orthogonal to the field direction (i.e. the materials have positive dielectric anisotropy and negative conductivity anisotropy). The two competing forces give rise to an electro-hydrodynamic instability in the liquid crystal fluid that is referred to as 'dynamic scattering'. In smectic A materials the dynamic scattering state strongly scatters light and (in contrast to the similar state in nematic materials) the disruption of the SmA structure that it produces remains after the electrical pulse causing it has terminated. The reversibility between the clear, uniformly oriented, state and the ion-transit induced, poly-domain, scattering state, depends upon the different frequency domains in which these processes operate. Dynamic scattering requires the field driven passage of ions through the liquid crystal fluid. It therefore occurs only with DC or low frequency AC drive.

Higher frequencies cause dielectric re-orientation (the ions cannot "move" at these frequencies) thus re-establishing a uniform orientation of the molecules.

Thus the combination of dielectric re-orientation (into a clear transparent state) and dynamic scattering (into a strongly light scattering state) in a suitably doped SmA phase (possessing positive dielectric anisotropy and negative conductivity anisotropy) can form the basis of an electrically addressed display. High frequencies (variable, typically ≥1000 Hz) drive the SmA layer into an optically clear state and low frequencies (variable, typically <200 Hz) drive it into the light scattering state. A key feature of such a display is that both these optical states are set up using short electrical addressing periods, and both persist indefinitely, or until they are re-addressed electrically. This is not true of the related phenomena in nematic liquid crystals. It is this property of electro-optic bistability (or more accurately multi-stability) that allows SmA dynamic scattering displays to be matrix addressed without pixel circuitry and which results in their extremely low power consumption in page-oriented displays or in smart windows.

CN-101533162 and WO 2009/111919 disclose an electrically controlled medium for controlling light includes two plastic thin film layers and a mixture layer is provided between the two thin film layers. The mixture layer consists of smectic liquid crystals, polymeric molecule materials and additives. Conductive electrode layers are provided on the sides of the two plastic thin film layers and the liquid crystal molecules exhibit different alignment states by controlling the size, frequency and acting time of the voltage applied to the conductive electrode layers, so that the electrically controlled medium for controlling light may be switched between a blurredly shielding state and a fully transparent state and even may be switched among a plurality of gradual states of different gray levels. Optionally the aspects of the present invention specifically exclude the arrangement disclosed in this specification.

Square wave driving of a single panel is potentially simple if both sides of the cell can be individually driven. At rest, both sides are grounded. To provide the square wave, one side is taken to a positive supply while the other is grounded, then the conditions are reversed. This has the advantage that dc balance is maintained without having to track two voltage supplies, and is only dependent on the accuracy of the square wave timing.

However, there are problems with any square wave drive system. The drive voltages required are unusually high for smectic A liquid crystal materials (typically ±100-150 volts), which can result in very large transient currents at the edges. Rate of change of voltage at the edges need to be limited or controlled to protect the liquid crystal and the transparent conductive coatings, either by series resistors or current controlling the pull-up and pall-down currents. This has to be done carefully to maintain dc balance.

A 250×250 mm (10"×10") single panel may have a capacitance of ~1 μF. With 100 μsec rise and fall times switching between −150 and +150 volts, means a current flow of nominally 3 Amps.

For an exemplary 2 kHz clearing waveform this gives an average current flow of ~¾ Amp from 150 volt power supplies. A "powered" sine wave drive having a 2 kHz frequency would result in an RMS current of 2.7 Amps from the supply This is dissipated in the drivers, the conductive coating, and the liquid crystal—giving rise to undesired heating effects, and hence the need for cooling.

In one aspect there is provided a driver for a smectic-A composition liquid crystal panel, the driver forming a resonant circuit operable to oscillate at resonant frequency for ordering the smectic-A liquid crystal composition of the panel.

The liquid crystal panel may form part of the resonant circuit.

The driver may have a node for mains supply for disordering the smectic-A composition liquid crystal.

The driver may further comprise a Q-improving reactance

The reactance may comprise a capacitor parallel to the panel.

In another aspect there is provided a method of driving a panel comprising two substrates sandwiching a smectic A liquid crystal composition, each substrate having a respective panel electrode, the method comprising driving said panel resonantly to cause disordering of the liquid crystal composition.

The liquid crystal composition may be a thermotropic liquid crystal composition exhibiting a smectic type A phase made up of multiple layers, wherein: under the influence of different electric fields applied between the electrodes, the alignment of the layers of the composition can become more ordered or more disordered, the composition has stable states in which the alignment of the layers of the composition are differently ordered including an ordered state, a disordered state and intermediate states, the composition being such that, once switched to a given state by an electric field, it remains substantially in that state when the field is removed.

The composition may comprise an ionic dopant dissolved in a smA liquid crystal host.

The composition may comprise, in weight %:
(a) 25-75% in total of at least one siloxane of the general formula I:

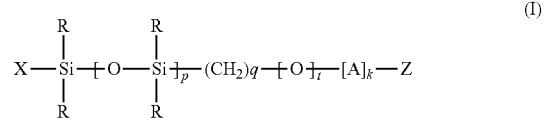

wherein
p=1 to 10, e.g. 1 to 3,
q=1 to 12, e.g. 6 to 10,
t=0 or 1,
k=2 or 3,
A is a phenyl or cyclohexyl ring which may be the same or different and are bonded together in para positions,
R=a $C_{1-3}$ alkyl group, e.g. methyl, which may be the same or different,
X=a $C_{1-12}$ alkyl group, and
Z=F, Cl, Br, I, CN, $NH_2$, $NO_2$, $NMe_2$, NCS, $CH_3$, or $OCH_3$, $CF_3$, $OCF_3$, $CH_2F$, $CHF_2$ especially CN;
(b) 0.001-1% in total of at least one quaternary ammonium salt of the general formula II:

wherein:
T=a methyl group or a silyl or siloxane group and
v=1 to 30, for example v=9 to 19, e.g. myristyl (v=13, T=methyl) or cetyl (v=15 and T=methyl),
R1, R2 and R3, which may be the same or different, are $C_{1-4}$ alkyl, e.g. methyl or ethyl,
$Q^-$ is an oxidatively stable ion, especially a $ClO_4^-$ ion, (c) 20-65% in total of at least one polarisable linear molecule having an alkyl chain, the molecule having the general formula III:

$$D-A'_k-Y \qquad (III)$$

wherein:
D stands for a $C_{1-16}$ straight chained alkyl or alkoxy group optionally containing one or more double bonds;
k=2 or 3,
A' is a phenyl, cyclohexyl, pyrimidine, 1,3-dioxane, or 1,4-bicyclo[2,2,2]octyl ring, wherein each A may be the same or different and are bonded together in para positions, the terminal ring attached to Y optionally being a phenyl and
Y is located in the para position of the terminal ring of the group $A'_k$ and is selected from Z (as defined above in connection with Formula I), $C_{1-16}$ straight chained alkyl, $C_{1-16}$ straight chained alkoxy, $OCHF_2$, $NMe_2$, $CH_3$, $OCOCH_3$, and $COCH_3$; and (d) 2-20%, optionally 5-15, in total of at least one side chain liquid crystal polysiloxane of the general formula IV:

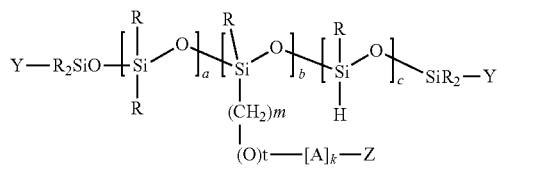

(IV)

wherein:
a, b and c each independently have a value of 0 to 100 and are such that a+b+c has an average value in the range 3 to 200, e.g. 5 to 20; and a is such that the chain units of the formula $Y—R_2SiO—[SiR_2—O]_a$ represents 0 to 25 mole percentage of the compound of the general formula IV, and c is such that the units of the formula chain $—[SiHR—O]_c—R_2SiO—Y$ represents 0 to 15 mole percentage of the compound of the general formula IV, m=3 to 20, e.g. 4 to 12;

t=0 or 1, k=2 or 3

A is a phenyl or cyclohexyl ring which may be the same or different and the rings are bonded together in para positions, R=a $C_{1-3}$ alkyl group, e.g. methyl, each of which may be the same or different, and Y=a $C_{1-12}$ alkyl group, a chromophore or a calamitic liquid crystal group and each of which may be the same or different, and Z is as defined above in connection with Formula I.

and wherein the amounts and nature of the components are selected such that the composition possesses smA layering, as detected by X-ray diffraction.

The siloxane oligomeric moiety (a) may be a compound of the formula Ia:

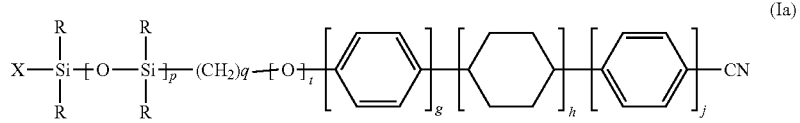

(Ia)

where X, R, p, q and t are defined above in connection with Formula I and g and h each independently stand for 0, 1 or 2 and j stands for 1, 2 or 3, subject to the requirement that g+h+j is 2 or 3.

The side chain siloxane liquid crystal, component (d), which may be a polymer, copolymer or terpolymer, may be a compound of the general formula IVa

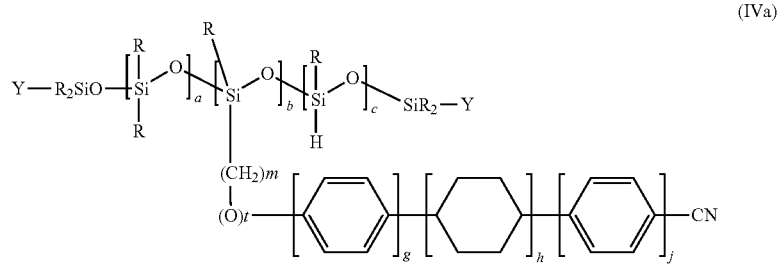

(IVa)

where a, b, c, m and t are as defined in connection with Formula IV, g=0, 1 or 2, h=0, 1 or 2, j=1, 2, or 3; subject to the requirement that g+h+j is 2 or 3; each R may be the same or different and is an alkyl group, e.g. methyl; and Y=a $C_{1-8}$ alkyl group, a chromophore or a calamitic liquid crystal group.

The ionic anion (b) of formula may be a compound of the formula (IIa):

(IIa)

where v, R1, R2, R3 and Q are as defined in claim 1 in connection with Formula II.

The ionic anion of formula II may be a compound of the formula IIb:

(IIb)

wherein v, R1, R2, R3 and Q are as defined in claim 1 or claim 4 in connection with Formula II and T' is a silyl or siloxane group.

Component (c) may comprise an organic calamitic mesogen which exhibits either a nematic or a Smectic A liquid crystal phase.

The at least one polarisable linear molecule, component (c), may include a compound of the formula IIIa and/or a compound of the formula IIIb.

(IIIa)

(IIIb)

where a=1 to 15 and b=1 to 13; f=0 or 1, j=1, 2 or 3; g=0, 1 or 2, h=0, 1 or 2, subject to the requirement that g+h+j does not exceed 3.

The composition may further include:
(e) up to 10% by weight in total of at least one positive or negative dichroic dye, optionally a cyan, yellow, magenta, red, green or blue dye or an emissive dye, e.g. a fluorescent or phosphorescent dye, the dye being aligned with neighbouring mesogenic components of the composition.

The composition may include:
(f) up to 10% of one or more viscosity-reducing solvents or diluents.

The compositions may thither include:
(g) up to 1.0 wt % of at least one molecule e.g. a lath-shaped molecule, that is not a liquid crystal, but which can be incorporated into the formulation, without degrading the smectic A layer quality of the composition.

The at least one molecule that is not a liquid crystal may comprise a compound of the formula (V):

(V)

The composition may also include:
(h) up to 50% by weight, e.g. up to 40%, in total of at least one birefringence-altering Additive, e.g. birefringence increasing additives, for example:

where R=$C_{1-10}$ alkyl, n=0 or 1, where R=$C_{1-10}$ alkyl, n=0 or 1, L is selected from hydrogen, or $C_{1-3}$ alkyl an X=CN, F, NCS, CF$_3$, OCF$_3$ or $C_{1-6}$ alkyl or where R is a $C_{1-6\ 10}$ alkyl group, or birefringence lowering additives, for example:

where R=a $C_{1-6\ 10}$ alkyl group, or where R=a $C_{1-10}$ alkyl group where R=a $C_{1-10}$ alkyl group The total amount of the birefringence-altering additive component (h) and the total amount of component (c) may be in the range of 35-73 wt %. e.g. 40-65 wt % or 45-60 wt %.

The composition may have a birefringence in the range 0.15 to 0.3, and preferably 0.16 to 0.2, at 20° C. and 589 nm and be opaque in the disordered state and clear in the ordered state.

The composition may include up to 10% by weight in total of at least one positive or negative dichroic dye, optionally a cyan, yellow, magenta, red, green or blue or a black dye, or an emissive dye, e.g. a fluorescent or phosphorescent dye, the dye being aligned with neighbouring mesogenic components of the composition.

The composition may have a birefringence in the range 0.07 to 0.15, and preferably 0.1 to 0.13, at 20° C. and 589 nm, (ii) is translucent in the disordered state and clear in the ordered state and (iii) includes up to 10% by weight in total of at least one positive or negative dichroic dye, optionally a cyan, yellow, magenta, red, green or blue dye, or a black dye or an emissive dye, e.g. a fluorescent or phosphorescent dye, the dye being aligned with neighbouring mesogenic components of the composition.

In the figures.

Figure 1:
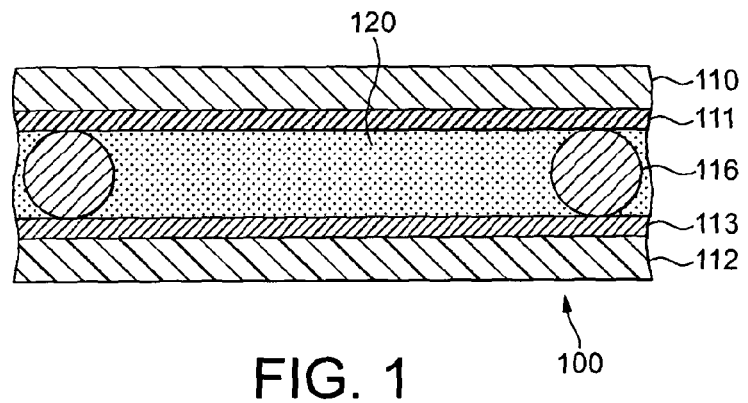
FIG. 1 shows a cross sectional view of a panel comprising a Smectic A liquid composition.

Referring to FIG. 1 a panel (100) has a pair of substrates (110,112) that are transparent to visible light. The substrates (100) may in some embodiments be glass, or they may be a flexible material, such as PET. Each substrate (110,112) supports a respective electrode (111, 113), which electrodes are of a material that is transmissive of visible light—for example ITO. The substrates and their electrodes are maintained spaced apart by spacers (116) here shown as spheres. The arrangement defines a cavity (120) filled with a thermotropic liquid crystal composition.

The composition in this embodiment contains an ionic dopant dissolved in a SmA liquid crystal host.

The composition is one that exhibits a smectic type A phase made up of multiple layers and capable of forming a liquid crystal optical device when sandwiched between a pair of electrodes, wherein under the influence of different electric fields applied between the electrodes, the alignment of the layers of the composition can become more ordered or more disordered and the composition has stable states in which the alignment of the layers of the composition are differently ordered including an ordered state, a disordered state and intermediate states, the composition being such that, once switched to a given state by an electric field, it remains substantially in that state when the field is removed.

Some useful compositions are recited in PCT/US10/27328, claiming priority from U.S. patent application 61/314,039.

Figure 2:
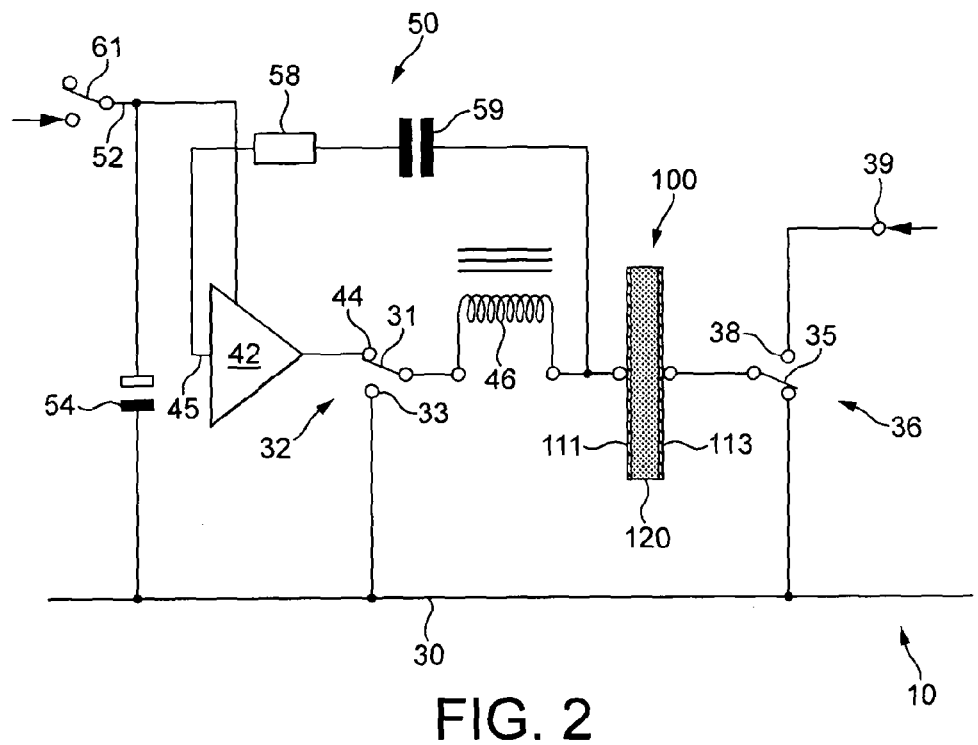
FIG. 2 shows a schematic diagram of a driver circuit for the panel.

Referring to FIG. 2 there is shown a drive circuit (10) for the smectic-A liquid crystal panel (100) of FIG. 1, the circuit capable of supplying a mains frequency scattering sine-wave voltage and a clearing frequency (having a frequency of 2-4 kHz in this embodiment). The first electrode (111) is connected Ida an inductor (46) to the wiper (31) of a first controlled electronic changeover switch (32), having one pole (33) connected to a reference terminal 30 and the other to the output (44) of an amplifier (42), in this embodiment an audio power amplifier. The inductor is, in this embodiment, a high-current series inductor for example small gapped iron core device. The second electrode (113) is connected to the wiper (35) of a second controlled electronic changeover switch (36), having one pole (37) connected to the reference terminal (30), and the other pole (38) to the secondary winding terminal (39) of a mains transformer (not shown). The electronic switches are controlled so they may be operated in mutual opposition. Thus in use when the first plate electrode (111) is connected to the earth reference terminal via the inductor (46) and the first switch (32), the second electrode (113) is connected to the transformer secondary terminal (39); when the switches change over the second electrode (113) is connected to earth and the first terminal (111) is connected via the inductor (46) to the amplifier output (44). In a rest state both switches are operable to connect their wipers to earth.

The first electrode (111) is connected via an RC feedback circuit (50) having a resistor (58) and capacitor (59) to the non-inverting input (45) of the amplifier (42) providing positive feedback. The amplifier (42) is powered at a low voltage DC supply node (52). An electrolytic capacitor (54) prevents noise being fed back to the supply, and also provides a charge reservoir—see later.

The inductor (46) and the panel (100) form an LC series resonant circuit. The period of the resonant circuit is set by choice of inductance and is selected to oscillate at the desired frequency, for the liquid crystal composition of this embodiment, around 2-4 KHz. In this embodiment the drive circuit is self-oscillating.

In use, the first switch (32) is switched to the "amplifier-connected" position as shown, with the second switch (36) causing the second electrode to connect to earth. Operating a switch (61) causes dc current to be applied to the amplifier (42). The amplifier (42) sources current into the inductor (46). Current rises through the inductor (46) and charge flows to the panel (100). As is well known to the skilled person, the panel voltage rises as it becomes charged, and this opposes the flow of current through the inductor (46), which thus tends to decrease. The panel voltage reaches a maximum at the point just before the capacitance of the panel starts to discharge into the inductor (46), and at that instant, the feedback circuit causes the amplifier (42) to change from a source mode to a sink mode. The positive-going half sine wave voltage caused by the amplifier sourcing current is then followed by a negative going half sine wave to form a full sinusoidal drive. This is followed by successive constant amplitude sine waves until the switch (61) is opened. Then charge from the charge reservoir capacitor (54) continues to supply the resonant circuit consisting of inductor (46), the internal capacitance of the panel (100), and any additional components (not shown) including a capacitor parallel to the panel (100) as required to improve the circuit quality, the Q-factor, which will continue to resonate with decreasing voltage levels as the charge is dissipated by the circuit losses.

The maximum voltage excursion across the panel is dependent on the dc leakage current through the panel in combination with any other dc leakage paths. These may be regarded as a parasitic resistance in parallel with the panel capacitance, damping resonance of the circuit 60. The maximum voltage across the panel is the supply voltage multiplied by the Q (quality factor) of the resonant circuit.

As the panel (100) is itself one of the frequency determining elements of the LC circuit, any capacitance changes caused, for example, by environmental changes or aging, will be followed by the circuit itself.

By using a resonant circuit the drive, voltage is much lower (depending on the circuit "Q"), and the dissipated power very much lower, both by comparison with a direct sinusoidal drive.

In the embodiment, mains 50 or 60 Hz is used to scatter the panel (RMS current ~70 mA).

Figure 3:
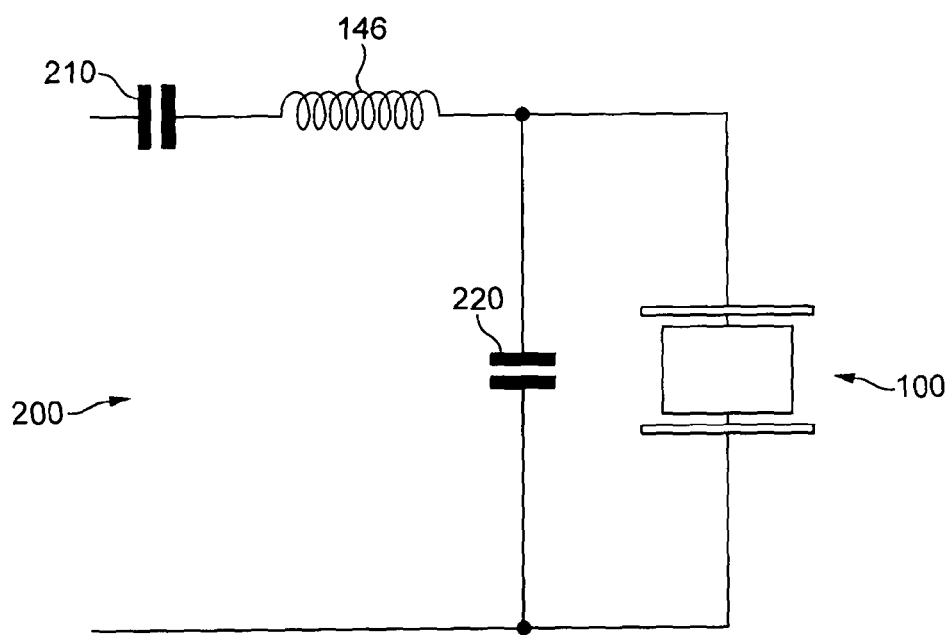
FIG. 3 shows a partial schematic of an alternative output circuit of a panel driver.

Referring to FIG. 3, an alternative output circuit (200) has a dc blocking capacitor (210) supplying ac drive to one terminal of an inductor (146), the inductor having its second terminal coupled to the panel (100). An additional capacitor (220) parallels the panel. In use the additional capacitor, which has—in an embodiment—a capacitance of about 3 times that of the panel, allows a higher Q, which means a greater voltage magnification factor.

The downside of the additional capacitor is the need to supply charging current to it; this current will of course be out of phase with the voltage and hence wattless but nonetheless it does increase the sourcing needs of the supply.

The voltage applied depends on cell dimensions, especially thickness, and also on frequency. The length of time it is necessary to apply voltages for either scattering or clearing also depends on both cell thickness and frequency. For clearing, it has been shown that higher frequencies require less voltage or less time; for scattering, reducing frequency may allow lower voltage or less time to be used.

The invention is not restricted to the specific embodiments described.

The invention claimed is:

1. A driver for a smectic-A composition liquid crystal panel, the driver forming a resonant circuit operable to oscillate at resonant frequency for ordering a smectic-A liquid crystal composition of the liquid crystal panel, wherein the resonant circuit comprises the liquid crystal panel and wherein the liquid crystal panel comprises the liquid crystal composition.

2. A driver according to claim 1 further comprising a node for disordering the smectic-A liquid crystal composition.

3. A driver according to claim 1 further comprising a Q-improving reactance.

4. A driver according to claim 3, wherein the reactance comprises a capacitor parallel to the panel.

5. A method of driving a panel comprising two substrates sandwiching a liquid crystal composition exhibiting smectic-A properties, each substrate having a respective panel electrode, the method comprising:

driving said panel resonantly to cause disordering of the liquid crystal composition.

6. A driver according to claim 1, wherein the liquid crystal composition is a thermotropic liquid crystal composition exhibiting a smectic type A phase made up of multiple layers, wherein: under the influence of different electric fields applied between the electrodes, the alignment of the layers of the composition can become more ordered or more disordered, the composition has stable states in which the alignment of the layers of the composition are differently ordered including an ordered state, a disordered state and intermediate states, the composition being such that, once switched to a given state by an electric field, it remains substantially in that state when the field is removed.

7. A driver according to claim 1, wherein the composition comprises an ionic dopant dissolved in a SmA liquid crystal host.

8. A driver according to claim 1, wherein the composition comprises, in weight %:

(a) 25-75% in total of at least one siloxane of the general formula I:

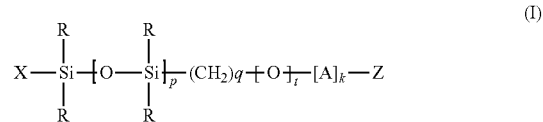

wherein:

p is 1 to 10, q is 1 to 12, t is 0 or 1, k is 2 or 3, each A is independently a phenyl or cyclohexyl ring and all A are bonded together in para positions, each R is independently a $C_{1-3}$ alkyl group, X is a $C_{1-12}$ alkyl group, and Z is F, Cl, Br, I, CN, $NH_2$, $NO_2$, $NMe^2$, NCS, $CH_3$, $OCH_3$, $CF_3$, $OCF_3$, $CH_2F$, or $CHF_2$, (b) 0.001-1% in total of at least one quaternary ammonium salt of the general formula II:

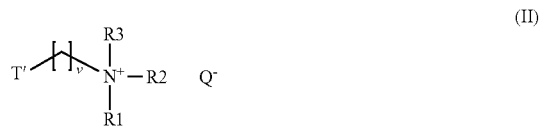

wherein:

T is a methyl group or a silyl or siloxane group, v is 1 to 30, each of R1, R2 and R3 is independently $C_{1-4}$ alkyl, and $Q^-$ is an oxidatively stable ion, (c) 20-65% in total of at least one polarisable linear molecule having an alkyl chain, the molecule having the general formula III:

wherein:

D is a $C_{1-16}$ straight chained alkyl or alkoxy group optionally containing one or more double bonds, k is 2 or 3, each A' is independently a phenyl, cyclohexyl, pyrimidine, 1,3-dioxane, or 1,4-bicyclo[2,2,2]octyl ring, and all A are bonded together in para positions, the terminal ring attached to Y optionally being a phenyl, and Y is located in the para position of the terminal ring of the group $A'_k$ and is selected from Z as defined above in connection with Formula I, $C_{1-16}$ straight chained alkyl, $C_{1-16}$ straight chained alkoxy, $OCHF_2$, $NMe_2$, $CH_3$, $OCOCH_3$, and $COCH_3$; and (d) 2-20% in total of at least one side chain liquid crystal polysiloxane of the general formula IV:

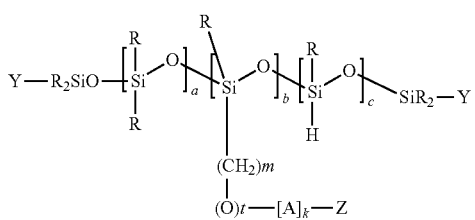

(IV)

wherein:

a, b and c each independently have a value of 0 to 100 and are such that a+b+c has an average value in the range 3 to 200, and a is such that the chain units of the formula Y—R$_2$SiO—[SiR$_2$—O]$_a$ represents 0 to 25 mole percentage of the compound of the general formula IV, and c is such that the units of the formula chain —[SiHR—O]$_c$—R$_2$SiO—Y represents 0 to 15 mole percentage of the compound of the general formula IV, m is 3 to 20,
t is 0 or 1,
k is 2 or 3,
each A is independently a phenyl or cyclohexyl ring and all A are bonded together in para positions,
each R is independently a C$_{1-3}$ alkyl group, and
each Y is independently a C$_{1-12}$ alkyl group, a chromophore or a calamitic liquid crystal group, and Z is as defined above in connection with Formula I,
and wherein the amounts and the components are selected such that the composition possesses SmA layering, as detected by X-ray diffraction.

9. A driver according to claim 8, wherein R is methyl.

10. A driver according to claim 8, wherein v is 13 or 15 and T is methyl.

11. A driver according to claim 8, wherein Z is CN.

12. A driver according to claim 9, wherein Z is CN.

13. A driver according to claim 8, wherein Q$^-$ is a ClO$_4^-$ ion.

14. A driver according to claim 8, wherein a+b+c has an average value in the range 5 to 20.

* * * * *